(12) United States Patent
Reid

(10) Patent No.: US 11,406,158 B1
(45) Date of Patent: Aug. 9, 2022

(54) PROTECTIVE GARMENT

(71) Applicant: Ryan Bartlett Reid, Imperial, TX (US)

(72) Inventor: Ryan Bartlett Reid, Imperial, TX (US)

( * ) Notice: Subject to any disclaimer, the term of this patent is extended or adjusted under 35 U.S.C. 154(b) by 235 days.

(21) Appl. No.: 16/595,308

(22) Filed: Oct. 7, 2019

Related U.S. Application Data

(60) Provisional application No. 62/752,587, filed on Oct. 30, 2018.

(51) Int. Cl.
| | |
|---|---|
| *A43B 1/10* | (2006.01) |
| *A43B 23/02* | (2006.01) |
| *B32B 3/30* | (2006.01) |
| *B32B 5/02* | (2006.01) |
| *B32B 25/10* | (2006.01) |
| *A43B 5/18* | (2006.01) |
| *B32B 27/12* | (2006.01) |
| *B32B 5/26* | (2006.01) |
| *A43B 5/08* | (2006.01) |

(52) U.S. Cl.
CPC ............ *A43B 5/18* (2013.01); *A43B 23/0235* (2013.01); *B32B 3/30* (2013.01); *B32B 5/024* (2013.01); *B32B 5/26* (2013.01); *B32B 25/10* (2013.01); *B32B 27/12* (2013.01); *A43B 1/10* (2013.01); *A43B 5/08* (2013.01); *B32B 2255/02* (2013.01); *B32B 2255/26* (2013.01); *B32B 2437/02* (2013.01); *B32B 2571/02* (2013.01)

(58) Field of Classification Search
CPC ......... A43B 23/0235; A43B 1/10; B32B 3/30; B32B 25/10; B32B 2255/02; B32B 2437/02
See application file for complete search history.

(56) References Cited

U.S. PATENT DOCUMENTS

| | | | |
|---|---|---|---|
| 7,891,116 B1* | 2/2011 | Iglikov | A43B 23/0205 36/4 |
| 2013/0133229 A1* | 5/2013 | Ludemann | A43B 23/081 36/109 |
| 2016/0088900 A1* | 3/2016 | Baychar | B32B 5/026 442/414 |
| 2016/0303462 A1* | 10/2016 | Ramirez | A63B 71/141 |
| 2017/0248391 A1* | 8/2017 | Andresen | A43B 7/32 |
| 2018/0235312 A1* | 8/2018 | Hanft | A61F 5/0111 |

* cited by examiner

*Primary Examiner* — Joanna Pleszczynska
(74) *Attorney, Agent, or Firm* — Plager Schack LLP; Mark H. Plager; Kara Verryt

(57) ABSTRACT

A protective garment for preventing or lessening injury from an external source to a user may include a layered construction made of an inner layer made of a synthetic rubber, the inner layer designed to be positioned against a user's body; a middle layer made of a woven textile; and an outer layer made of an irregular surfaced material. The garment may be a boot, wherein the layered construction makes the boot body. The boot may also include a closure and a sole attached to the boot body.

3 Claims, 4 Drawing Sheets

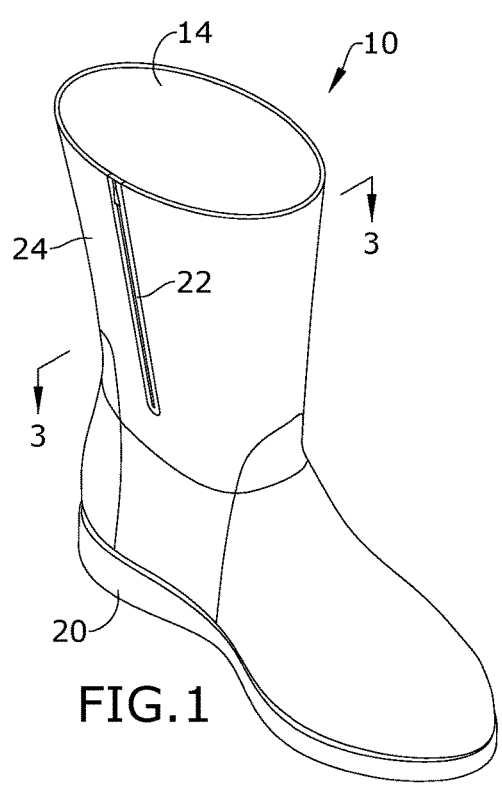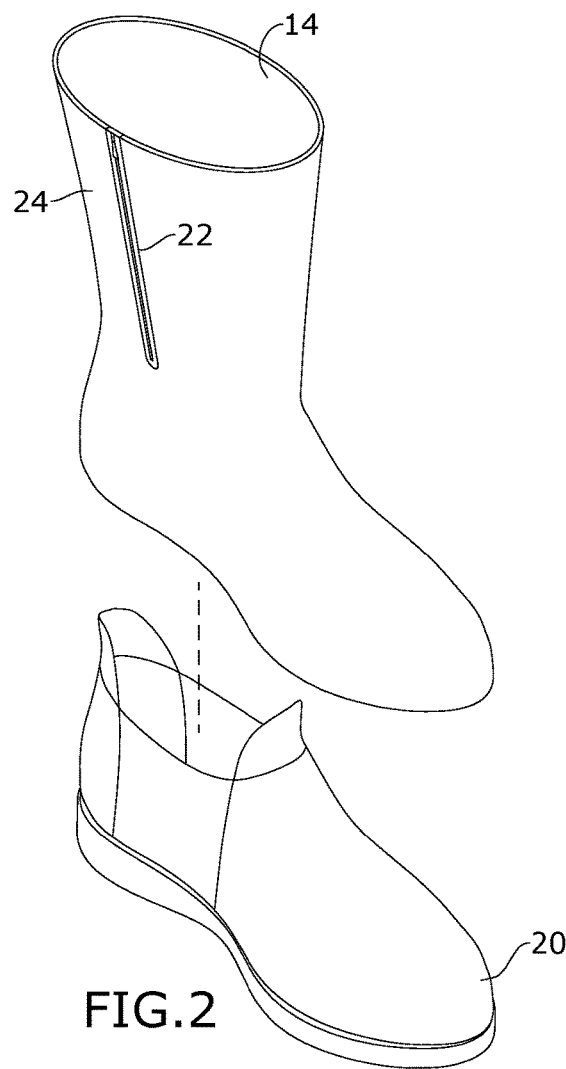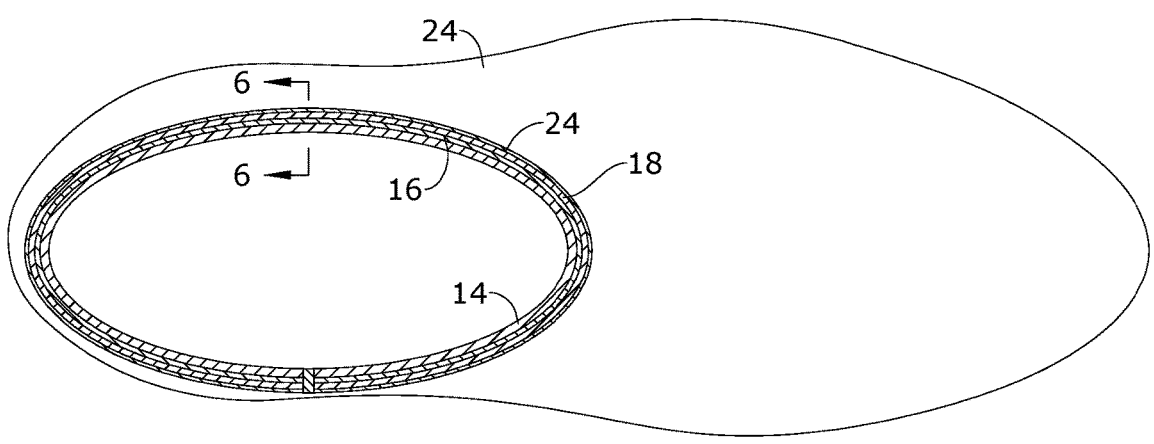

PROTECTIVE GARMENT

RELATED APPLICATION

This application claims priority to provisional patent application U.S. Ser. No. 62/752,587 filed on Oct. 30, 2018, the entire contents of which is herein incorporated by reference.

BACKGROUND

The embodiments described herein relate generally to protective garments, and more particularly, to a protective garment, such as a boot, for preventing a user from being poked, injured, or otherwise penetrated by an external material, such as a stingray stinger, glass, and the like.

Individuals involved in water sports, such as fishing and surfing, are at high risk of leg and foot injury by being stung or poked by marine animals, such as stingrays and sea urchins. They are also at risk of foot and leg injuries from glass, rocks, and other objects submerged in the water.

Currently available boots are very heavy, stiff, and uncomfortable to wear due to comprising solid polycarbonate and/or plastic sheets used for protection. As such, the existing boots are cumbersome to walk in, particularly in the water. The protection provided by conventional boots is also not over 100% of the user's foot, leaving parts exposed to injury. About 90% of injury occurs to the lower ⅓ of the foot, which is the exact area of the foot left vulnerable by the existing products.

Therefore, what is needed is comfortable and lightweight garment that protects a user's entire foot from being stung or poked by marine animals and other external objects.

SUMMARY

Some embodiments of the present disclosure include a protective garment for preventing or lessening injury from an external source to a user. The protective garment may include a layered construction made of an inner layer made of a synthetic rubber, the inner layer designed to be positioned against a user's body; a middle layer made of a woven textile; and an outer layer made of an irregular surfaced material. The garment may be a boot, wherein the layered construction makes the boot body. The boot may also include a closure and a sole attached to the boot body.

BRIEF DESCRIPTION OF THE FIGURES

The detailed description of some embodiments of the invention is made below with reference to the accompanying figures, wherein like numerals represent corresponding parts of the figures.

FIG. 1 is perspective view of one embodiment of the present disclosure.

FIG. 2 is a partial exploded view of one embodiment of the present disclosure.

FIG. 3 is a section view of one embodiment of the present disclosure, taken along line 3-3 in FIG. 1.

DETAILED DESCRIPTION

Figure 4:
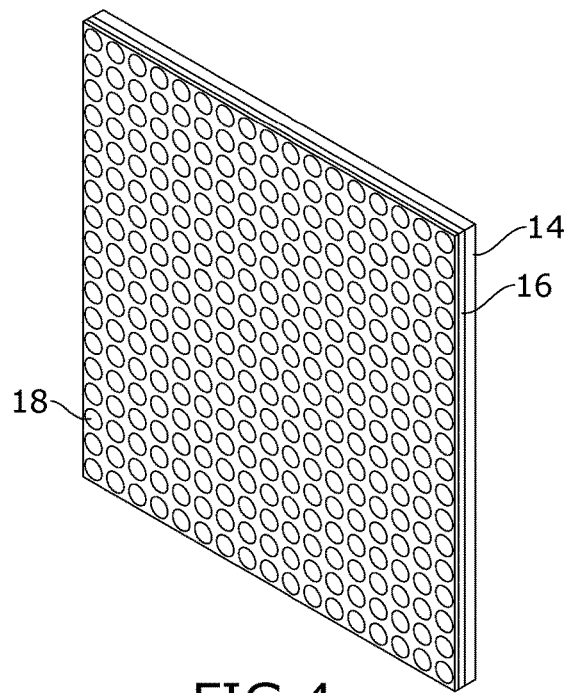
FIG. 4 is a perspective view of one embodiment of the present disclosure.
Figure 5:
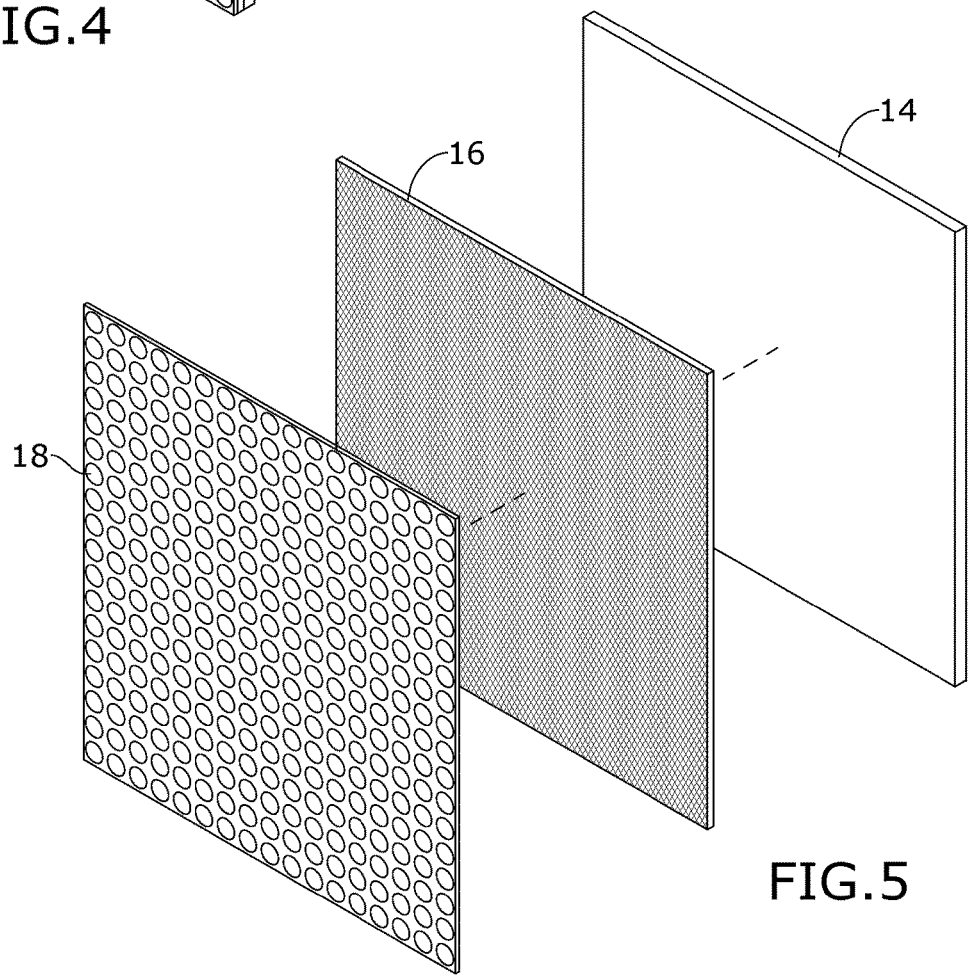
FIG. 5 is an exploded view of one embodiment of the present disclosure.
Figure 6:
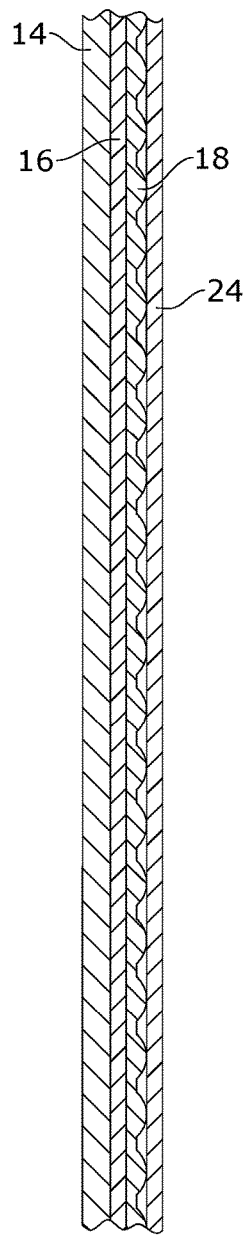
FIG. 6 is a section view of one embodiment of the present disclosure, taken along line 6-6 in FIG. 3.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a protective garment and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

a. Boot
b. Layered Construction

The various elements of the present disclosure may be related in the following exemplary fashion. It is not intended to limit the scope or nature of the relationships between the various elements and the following examples are presented as illustrative examples only.

By way of example, and referring to FIGS. 1-9, some embodiments of the invention include a protective garment, such as a boot 10, for preventing or lessening the likelihood of injury from an external source to a user, the garment comprising a layered construction comprising an inner layer 14 comprising a synthetic rubber, such as neoprene, the inner layer 14 designed to be positioned against a user's body; a middle layer 16 comprising a woven textile, such as an ultra-high molecular weight polyethylene; and an outer layer 18 comprising an irregular surfaced material. Optionally, the garment may further comprise an outer coating 24 on the outer layer 18, wherein the outer coating 24 may comprise a protective and semi-hard material, such as rubber, polyvinylchloride (PVC), plastic, or vinyl.

Figure 8:
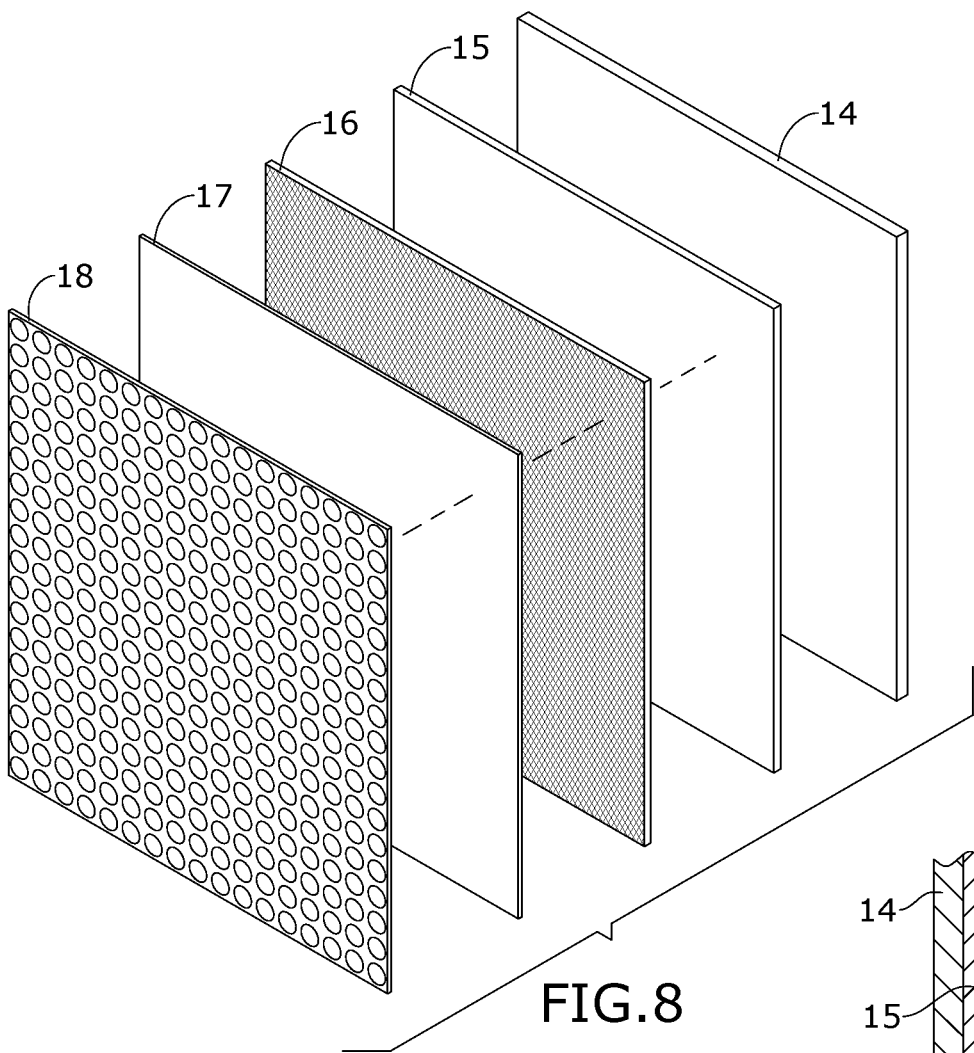
FIG. 8 is a perspective view of one embodiment of the present disclosure.
Figure 9:
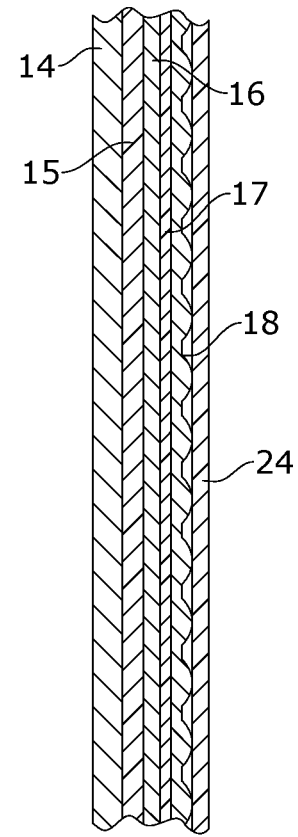
FIG. 9 is a section view of one embodiment of the present disclosure.

As shown in FIGS. 8 and 9, some embodiments of the layered construction may include additional optional layers. Specifically, the layered construction may also comprise an optional thin layer, such as a polyester layer 15, and/or an optional thin synthetic rubber layer 17. For example, as shown in FIGS. 8 and 9, the layered construction may comprise the optional polyester layer 15 sandwiched between the inner layer 14 and the middle layer 16. The layered construction may also comprise the optional thin synthetic rubber layer 17 sandwiched between the outer layer 18 and the middle layer 16. The optional polyester layer 15 may be laminated directly to middle layer 16 to improve the middle layer's puncture proof performance. The optional thin synthetic rubber layer 17 may facilitate the durable manufacture of the protective garment by allowing sewing of the outer layers.

As shown in FIGS. 1 and 2, some embodiments of the garment may comprise a boot 10, wherein the boot body comprises the layered construction. The boot 10 may further comprise a hard rubber sole 20 positioned at the bottom of the boot body 24, wherein the hard rubber sole 20 may comprise the same material as the protective outer coating 24. Finally, the boot body may further comprise a side zipper 22 or other optional closure, wherein the closure comprises a non-corrosive material. While the garment is shown as a boot 10 in the Figures, it is envisioned that the layered construction could be used to create other puncture and lacerative protection, such as wetsuits, gloves, and the like.

Figure 7A:
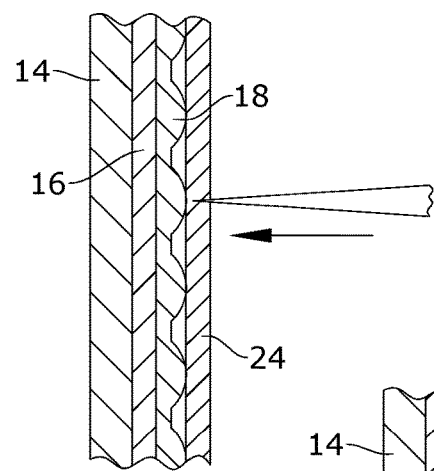
FIG. 7A is a detail section view of one embodiment of the present disclosure.
Figure 7B:
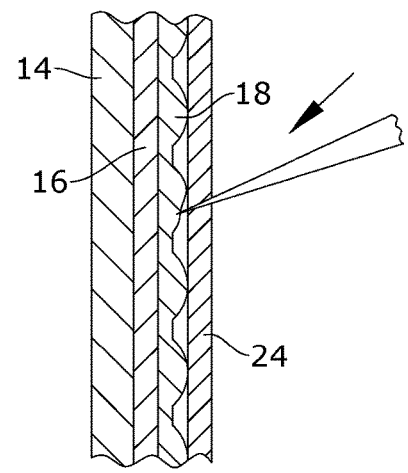
FIG. 7B is a detail section view of one embodiment of the present disclosure.
Figure 7C:
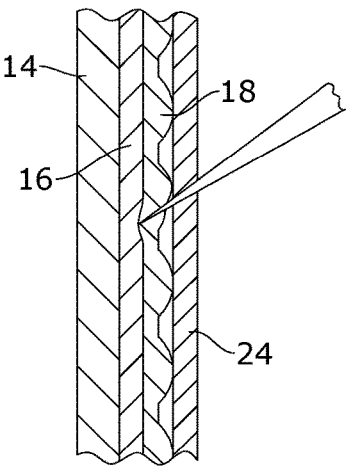
FIG. 7C is a detail section view of one embodiment of the present disclosure.

As mentioned above, an example of a suitable synthetic rubber for the inner layer 14 is neoprene, and an exemplary middle layer 16 may comprise an ultra-high molecular weight polyethylene or aramid. An irregular surfaced material 18 may include any textile with a rough texture or an irregular/non-smooth surface. The surface may include ribs, pocks, holes, bumps, ridges, dimples, indentations, points, and the like that make the surface multi-dimensional. Exemplary irregular surfaced materials include nylon materials, such as CORDURA brand textiles and those similar to CORDURA brand textiles. Additional examples include strong rib fabrics, which are textiles that have irregularly spaced large diameter threads, metal threads, or other materials that are woven into the base textile, giving it an irregular surface. Another example is PVC dot fabrics. Moreover, an irregular surfaced material 18 may be a textile that has a material sprayed, glued, or sewn onto the outer surface thereof to make it rough and irregular. The irregular surfaced material 18 may serve to deflect the puncturing or lacerating object into an obtuse or acute angle, as shown in FIGS. 7A-7C, whereas an outer protective coating 24 my reduce the energy of the puncturing or cutting object. Together with the middle layer 16, the irregular surfaced material 18 may prevent a fine point breaching the material at a 90 degree angle. The irregular surfaced material 18 forces the puncturing or laceration object into an angle other than perpendicular to the target, while the middle layer 16 may stop punctures and lacerations from continuing into the user. The inner layer 14 not only makes the garment comfortable, but also provides a final buffer between the wearer and the puncturing or lacerating object.

To manufacture the garment of the present disclosure, the layered construction may first be produced by attaching the layers to one another. This may be done, for example, by adhering the layers to one another using an adhesive. However, other means of attachment, such as sewing, are envisioned. The layered construction may then be formed into the desired garment, such as a boot 10.

In a particular example, the inner layer 14 may have waterproof, heat catalyzed, or similar adhesive spread over a first surface thereof. The middle layer 16 may be placed over the adhesive surface of the inner layer 14, creating a smooth, wrinkle free layer. The adhesive may be spread on the outside surface of the middle layer 16, and the irregular surfaced material 18 may be placed onto the adhesive surface of the middle layer 16, wherein the irregular surfaced material 18 may be smoothed and wrinkles and bubbles may be pressed out. The layered material may then be heated to catalyze and dry the adhesive. Heating may be done in an oven or with a heating iron or air dryer. The laminated layered construction may then be laid out and the desired garment pattern may be cut from the laminated layered construction. The pieces of the pattern may be glued together, forming the overall garment. When included, the zipper 22 or other closure may then be glued to the desired surface of the garment, and the garment may be heated again to catalyze the adhesive. In the case of a boot 10, the now formed boot body may be placed in an injection mold to inject the sole 20 and outer protective coating 24 onto the boot body and vulcanize it to bond the rubber or plastic to the boot body.

To use the garment of the present disclosure, a user would simply place the garment on his or her body and proceed to the desired activity as normal.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A protective garment for preventing or lessening injury from an external source to a user, the garment comprising:
   a layered construction comprising:
      an inner layer comprising neoprene, the inner layer configured to be positioned against a user's body;
      a middle layer comprising a woven textile made from an ultra-high molecular weight polyethylene;
      a polyester layer sandwiched between the inner layer and the middle layer;
      an outer layer comprising an irregular-surfaced material; and
      a rubber protective outer coating applied to an outer surface of the outer layer,
   wherein:
      the irregular-surfaced material has a non-smooth, multi-dimensional surface comprising a plurality of surface features designed to deflect a puncturing object into an angle other than perpendicular; and
      the outer layer is made from nylon.

2. The protective garment of claim 1, wherein:
   the garment is a boot; and
   the boot comprises a boot body comprising the layered construction.

3. The protective garment of claim 2, wherein the boot further comprises a sole positioned at and attached to a bottom surface of the boot body.

* * * * *